United States Patent [19]

Saito et al.

[11] Patent Number: 4,586,678
[45] Date of Patent: May 6, 1986

[54] AUTOMATIC LOCKING RETRACTOR

[75] Inventors: Hiroyuki Saito, Chigasaki; Takeo Ueda, Fujisawa, both of Japan

[73] Assignee: NSK-Warner K.K., Japan

[21] Appl. No.: 715,181

[22] Filed: Mar. 22, 1985

[30] Foreign Application Priority Data

Mar. 28, 1984 [JP] Japan .............................. 59-43273[U]
Jul. 16, 1984 [JP] Japan ............................. 59-106445[U]

[51] Int. Cl.$^4$ ...................... B60R 22/34; B65H 75/48
[52] U.S. Cl. ............................................. 242/107.4 D
[58] Field of Search .................. 242/107.4 D, 107.4 R; 280/807; 297/476

[56] References Cited

U.S. PATENT DOCUMENTS

| 3,809,332 | 5/1974 | Hayashi | 242/107.4 D |
| 3,944,163 | 3/1976 | Hayashi et al. | 242/107.4 D X |
| 3,945,586 | 3/1976 | Higbee et al. | 242/107.4 D |

FOREIGN PATENT DOCUMENTS

| 17818 | 2/1973 | Japan . |
| 21466 | 6/1976 | Japan . |
| 85250 | 6/1984 | Japan . |

Primary Examiner—John M. Jillions
Attorney, Agent, or Firm—Wegner & Bretschneider

[57] ABSTRACT

An improved automatic locking retractor for use with a seatbelt system designed to operate with improved reliability while having a simplified structure. An improved control mechanism is provided for governing the locking of the seatbelt system when appropriate. The control mechanism is a control plate which cooperates with a latch plate which in turn cooperates with the take-up reel of the seatbelt system. Movement of the control plate controls the movement of a locking lever which selectively locks the latch plate to lock the take-up reel when appropriate.

5 Claims, 10 Drawing Figures

AUTOMATIC LOCKING RETRACTOR

DESCRIPTION OF RELATED APPLICATION

This invention relates to an improvement to the subject matter of U.S. Pat. No. 4,541,580 issued Sept. 17, 1985 and assigned commonly to the present assignee.

BACKGROUND OF THE INVENTION

1. Field of the Invention

This invention relates to a retractor, more specifically, an automatic locking retractor suitable for incorporation in a seat belt system and adapted to wind and release its webbing.

2. Description of the Prior Art

A wide variety of automatic locking retractors has hitherto been proposed to lock the release of a webbing when the webbing has been worn up subsequent to its release and some suitable fastening procedure thereof. Many of such conventional automatic locking retractors were however unable to satisfy both of the requirement for fewer parts and simple structure and that for a structure permitting the incorporation of a design which features excellent working performance and operability.

SUMMARY OF THE INVENTION

An object of this invention is to provide an automatic locking retractor for a vehicle seat belt, which can meet both of the above-mentioned requirements.

In one aspect of this invention, there is thus provided an automatic locking retractor which comprises:

a casing;

a take-up reel rotatably supported on the casing and biased in the winding direction of a webbing;

an interlocked member rotatable as a unitary member with the take-up reel;

an interlocking member supported on the casing movably between a first engagement position and a first non-engagement position in accordance with the diameter of the webbing taken up on the take-up reel, said interlocking member being brought into engagement with the interlocked member at the first engagement position so as to prohibit the rotation of the take-up reel in the webbing-releasing direction but being kept out of engagement with the interlocked member at the first non-engagement position so as to permit free rotation of the take-up reel;

a plurality of first interlocking portions formed on the interlocked member;

a control member equipped with a plurality of second interlocking portions and supported on the take-up reel in such a way that the control member is turnable between a non-working position most turned in the webbing-releasing direction and a working position most turned in the webbing-winding direction, and about a rotary shaft of the take-up reel, and is also movable in a direction perpendicular to the rotary shaft of the take-up reel between a second engagement position where the second interlocking portions engage the first interlocking portions and a second non-engagement position where the second interlocking portions do not engage the first interlocking portions, said control member having a working portion capable of engaging the interlocking member at the non-working position to inhibit the movement of the interlocking member to the first engagement position and a non-working portion permitting the movement of the interlocking member to the first engagement position at the working position; and means for allowing at least one of the second interlocking portions to engage at least one of the first interlocking portions at a third engagement position which is achieved by a reduction of the diameter of the webbing taken up on the take-up reel and the engagement of the interlocking member with the working portion upon release of the webbing, and upon subsequent rotation of the take-up reel in the webbing-winding direction, for causing the control member to turn in the same direction as the take-up reel so as to bring the control member from the non-working position to the working position.

In another aspect of this invention, there is also provided an automatic locking retractor which comprises:

a casing;

a take-up spindle rotatably supported on the casing and biased in the winding direction of a webbing;

an interlocked member rotatable as a unitary member with the take-up spindle and defining a plurality of acting portions directed to the webbing-winding direction;

an interlocking member supported on the casing movably between a lock position and a non-lock position in accordance with the diameter of the webbing taken up on the take-up spindle, said interlocking member being brought into engagement with the interlocked member at the lock position so as to prohibit the rotation of the take-up spindle in the webbing-releasing direction but being kept out of engagement with the interlocked member at the non-lock position so as to permit free rotation of the take-up spindle;

first biasing means normally urging the interlocking member toward the lock position;

a control member equipped with a working portion and an interlocking portion and provided on the base in such a way that the control member is movable between a non-working position, where the control member has moved in the webbing-releasing direction and is kept at the working portion thereof in engagement with the interlocking member so as to prohibit the movement of the interlocking member toward the lock position, and a working position where the control member has moved in the webbing-winding direction and permits the movement of the interlocking member toward the lock position and is also movable between an engagement position, where the interlocking portion is kept in engagement with either one of the acting portions and receives from the acting portion a force, which is to be exerted in such a direction as to move the control member toward the working position, when the take-up spindle rotates in the webbing-winding direction, and a non-engagement position where the interlocking portion is kept out of engagement with any one of the acting portions;

second biasing means normally urging the control member toward the non-working position with a biasing force smaller than the biasing force of the first biasing means; and guide means for guiding the control member between the non-working position and working position as well as between the engagement position and non-engagement position.

The above automatic locking retractors of this invention assure fail-free operations with excellent operability although they requires fewer parts and have simple structures.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENTS

Figure 1:
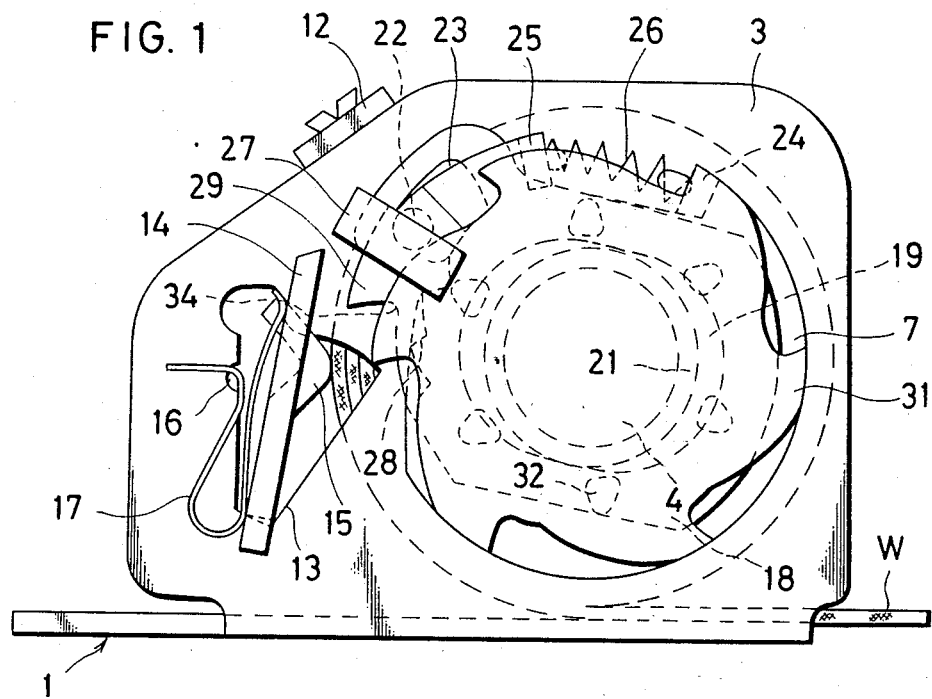
FIG. 1 is a front view of principal parts of an automatic locking retractor according to the first embodiment of this invention.
Figure 2:
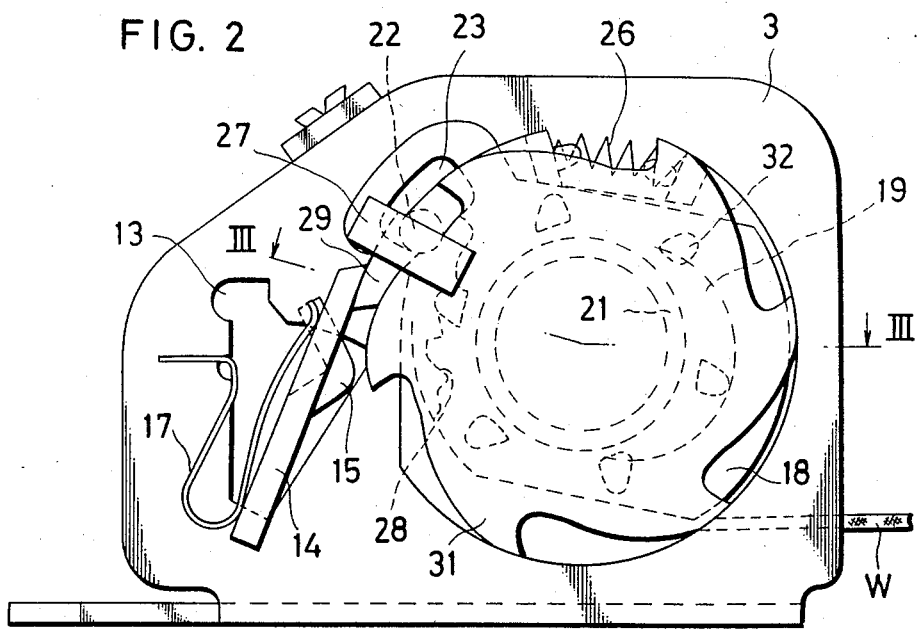
FIGS. 2, 4 and 5 are similar to FIG. 1 and illustrate the operation of the automatic locking retractor of FIG. 1.
Figure 3:
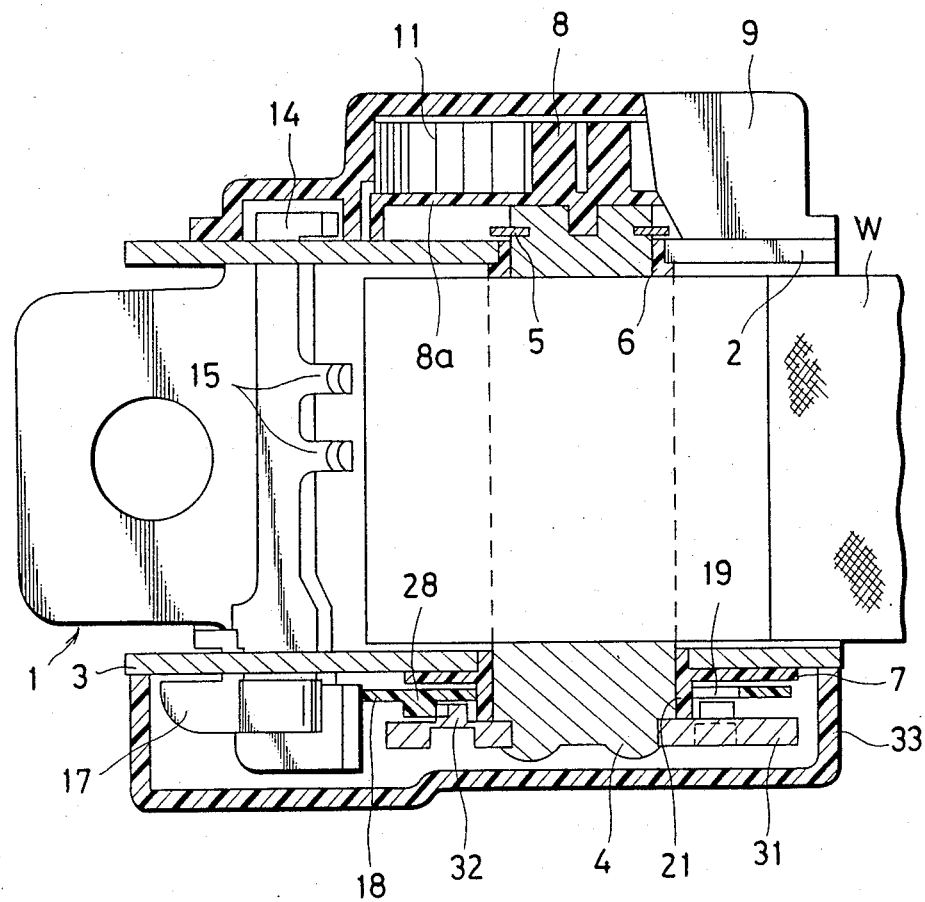
FIG. 3 is a cross-sectional view of the automatic locking retractor, taken along line III—III of FIG. 2.

The first embodiment of this invention will now be described with reference to FIGS. 1 through 5 of the drawings. In FIGS. 1 through 3, a take-up reel 4 on which a webbing W is fastened at one end thereof is supported between both side walls 2,3 of a square U-shaped casing 1. By a stopper ring 5, the take-up reel 4 is prevented from moving along a rotary shaft (not shown) of the take-up reel 4. The take-up reel 4 is supported on the casing 1 by way of bushes 6 and bush plates 7 which are both fixedly secured on the casing 1. The take-up reel is biased in the webbing-winding direction (i.e., in the clockwise direction as seen in FIG. 1) by a take-up spring 11 which is hooked at the inner end thereof on a spring plate 8 fixedly attached to one end of the take-up reel 4 and at the outer end thereof on a spring cover 9 provided fixedly on the side wall 2. The spring plate 8 includes a disc-shaped portion 8a, whereby to avoid possible spread of grease, which has been applied for the take-up spring 11, onto the webbing W. Between the side walls 2,3 of the casing 1, a reinforcement plate 12 extends for the reinforcement of the casing 1.

Through the side walls 2,3, sector-shaped openings 13 are bored in a mutually-opposing relation. A lock lever 14, which serves as an interlocking member, extends through the sector-shaped openings 13, in which the lock lever 14 is tiltably supported. A sensor 15, which is adapted to determine the diameter of the webbing taken up on the take-up reel and then to actuate the lock lever 14 depending on the size of the diameter, is formed on the lock lever 14 at a longitudinal midpoint thereof. The lock lever 14 is biased toward an engagement position (i.e., in the clockwise direction as seen in FIG. 1; will be described herein) by a leaf spring 17 which is fixedly secured by a notch 16 formed in the edge of the opening 13.

On an outer end portion of the take-up reel 4 which portion is positioned outside the side wall 3, a control plate 18 is loose-fit as a control member outside the bush plate 7 in such a way that a cylindrical portion 21 of the bush plate 7 is fit within an elongated hole 19 formed through the control plate 18.

The bush plate 7 defines a slot 23 into which a projection 22, which limits the range of movement of the control plate 18, extends, thereby limiting the movement of the control plate 18. Owing to the provision of the slot 23 and projection 22, the control plate 18 is movable over a predetermined angular range, about the rotary shaft of the take-up reel 4 and relative to the casing 1 (Note: A slot of the same configuration as the slot 23 is also formed through the side wall 3 of the casing 1. The projection 22 is also fit within the slot of the side wall 3,) and is also movable within a predetermined range in a direction perpendicular to the rotary shaft (namely, substantially in the horizontal direction in FIG. 1). A coil spring 26 having a biasing force smaller than the biasing force of the leaf spring 17 extends between a spring support 24 provided on the side of the bush plate 7 and another spring support 25 provided on the side of the control plate 18. The coil spring 26 urges the control plate 18 in a direction that the projection 22 of the control plate 18 is kept in contact with the lower left edge of the slot 23 of the bush plate 7 as seen in FIG. 1.

The control plate 18 also defines a lug 27, teeth 28 which form three notches and a working portion 29 which is engageable with the lock lever 14. The lug 27, teeth 28 and working portion 29 will be described herein.

Still outside the control plate 18, a latch plate 31 is fixedly provided as an interlocked member on the take-up reel 4. The latch plate 31 has a plurality of teeth on the circumference thereof and six protrusions 32 as first interlocking portions on the inner surface thereof. Either one of the protrusions 32 is brought into engagement with one of the notches defined as the second interlocking portions by the teeth 28 so as to couple the control plate 18 and take-up reel 4 together as unitary members relative to the webbing-winding direction, when the lock lever 14 engages the working portion 29 and the control plate 18 is moved against the force of the spring 26 rightward as seen in FIG. 1. The lug 27 of the control plate 18 extends in the form of a square U so that the latch plate 31 enters the inner space of the lug 27 at a circumferential portion thereof. This structure prevents the control plate 18 from separating apart from the latch plate 31 along the rotary shaft.

In order to cover the above-mentioned members arranged on the side wall 3, a case 33 is fixedly provided on the side wall 3.

The operation of the above-described automatic locking retractor according to the first embodiment of this invention will next be described.

FIG. 1 shows the lock lever 14 raised leftward against the biasing force of the leaf spring 17 as a result of actuation of the sensor 15 subsequent to the winding of the webbing W on the take-up reel 4 in its entirety. In this state, the lock lever 14 is kept at a non-engagement position where it cannot be brought into engagement with any one of the teeth of the latch plate 31. Therefore, the webbing W may be freely released against the force of the take-up spring 11 or may be taken up by virtue of the force of the take-up spring 11. Owing to the force of the spring 26, the control plate 18 is at a position most turned counterclockwise (namely, in the webbing-releasing direction) and moved leftward. As this position, the teeth 28 are at a non-engagement position where they are unable to engage the protrusions 32 of the latch plate 31 and the working portion 29 is at a non-working position where it is engageable with the lock lever 14.

When the webbing W is released from its state shown in FIG. 1, the diameter of the webbing W taken up on the take-up reel 4 decreases little by little. As the diameter decreases, the lock lever 14 is progressively tilted clockwise. Eventually, the lock lever 14 is brought into engagement with the working portion 29 of the control plate 18 as shown in FIG. 2. Since the biasing force of the leaf spring 17 is set to be greater than that of the coil spring 26, the control plate 18 moves rightward to an engagement position where one of the notches between the teeth 28 is brought into contact and engagement with one of the protrusions 32 on the latch plate 31. In the state shown in FIG. 2, the webbing W can still be released because the lock lever 14 and latch plate 31 are still not engageable with each other.

Figure 4:
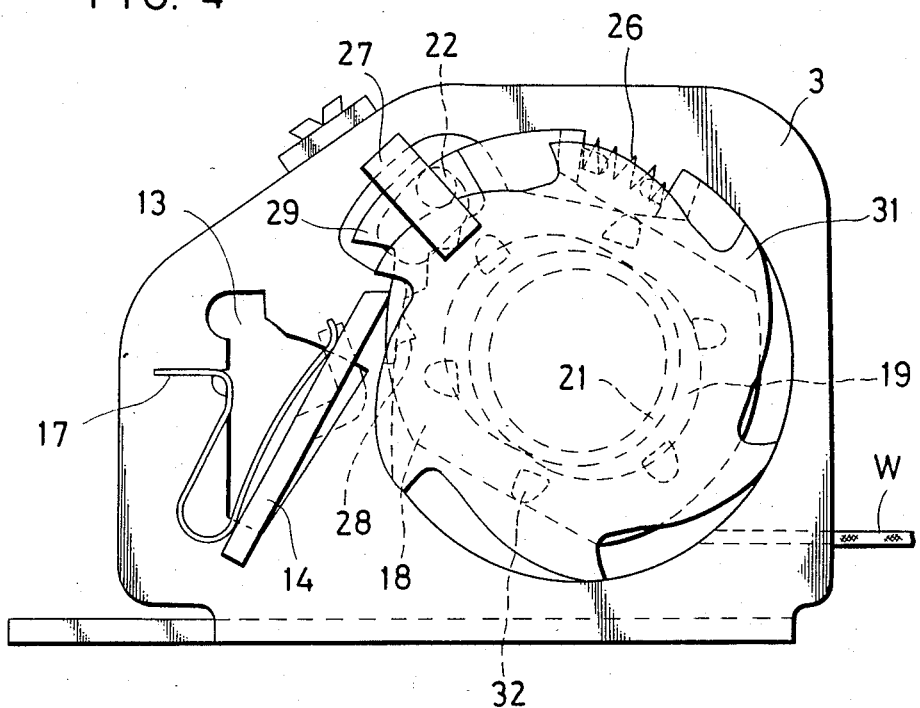

When the webbing W is allowed to move back slightly in the winding direction thereof after the webbing W has been released over a suitable length thereof, the control plate 18 and take-up reel 4 turn as unitary members in the same direction since they remain as unitary members in the winding direction. Thus, the control plate 18 is caused to turn to a working position in which the control plate 18 has been most turned in the webbing-winding direction. As illustrated in FIG. 4, the lock lever 14 is disengaged from the working portion 29. In this manner, the lock lever 14 becomes engageable with the latch plate 31. When it is attempted to release the webbing again, one of the circumferential teeth of latch plate 31 and the lock lever 14 engage each other to lock the release of the webbing W.

When a further attempt is made to rewind the webbing W into the retractor from its released, worn and locked state, the buckle of the seat belt system is released for example. Since the rotation of the take-up reel 4 in the webbing-winding direction is no longer prohibited, the webbing W is being taken up on the take-up reel W by virtue of the force of the take-up spring 11. Here, the sensor 15 detects the progressive increase of the diameter of the webbing W taken up on the take-up reel 4 and brings the lock lever 14 again into its non-engagement position shown in FIG. 1. As soon as the lock lever 14 is disengaged from the control plate 18, the control plate 18 is also brought into the non-working and non-engagement position depicted in FIG. 1. In this state, the retractor is ready for the next release of the webbing W.

Figure 5:
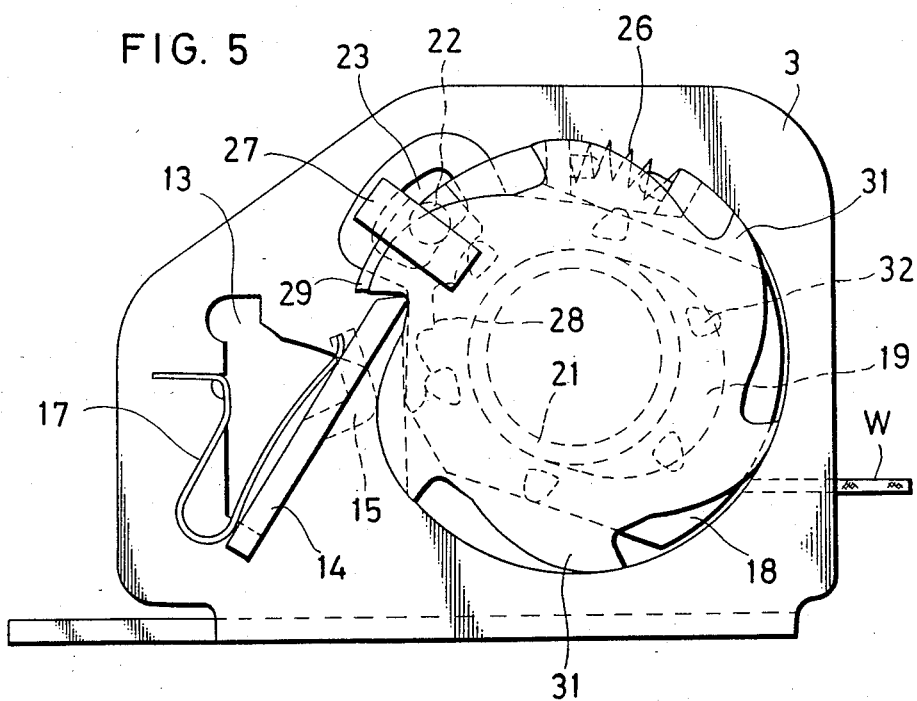

When the webbing W is wound back from its state shown in FIG. 5, such a state as illustrated in FIG. 4 is established instantaneously upon disengagement of one of the circumferential teeth of the latch plate 31 from the lock lever 14 because owing to the provision of the coil spring 26, a force is normally applied to the control plate 18 in the direction toward the non-engagement position. Namely, the lock lever 14 is brought into engagement with the notch 34 of the control plate 18 before it engages the immediately next circumferential tooth of the latch plate. While the resulting impact is absorbed by the coil spring 26, the lock lever 14 is brought into engagement with the next circumferential tooth. Accordingly, it is possible to reduce the impact noise which is produced as a result of direct collision between the lock lever 14 and the circumferential teeth of the latch plate, both being made of metals.

In the above-described first embodiment of this invention, the latch plate 31 is provided with six protrusions 32 while the control plate 18 includes three notches formed by the teeth 28. Therefore, the control plate 18 can engage without failure practically no matter which rotary position the control plate 18 assumes. It should be borne in mind that the numbers of these protrusions and notches are merely illustrative and may thus be changed in various ways, for example, to 4, 5 or the like.

As has been described above, the control member, which governs the movement of the lock lever as an interlocking member, is provided with the plurality of second interlocking portions. On the other hand, the latch plate is provided with their matching first interlocking portions. Therefore, the automatic locking retractor according to the first embodiment assures fail-free operation and excellent operability although it includes the fewer parts and has the simple structure.

Figure 6:
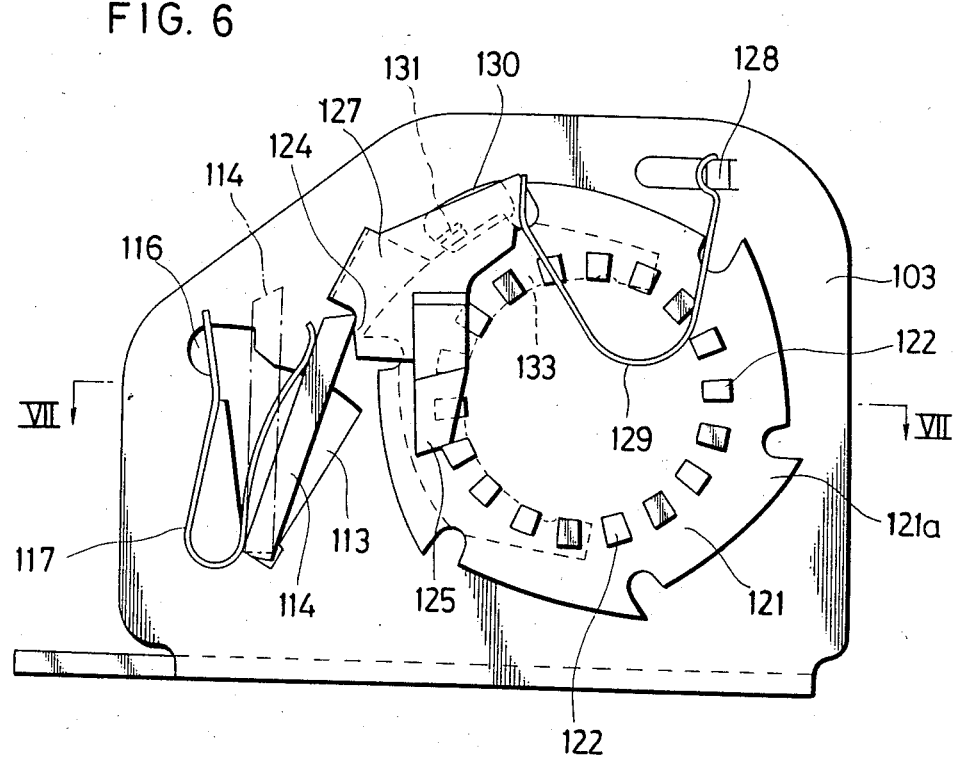
FIG. 6 is a front view of principal parts of an automatic locking retractor according to the second embodiment of this invention.
Figure 8:
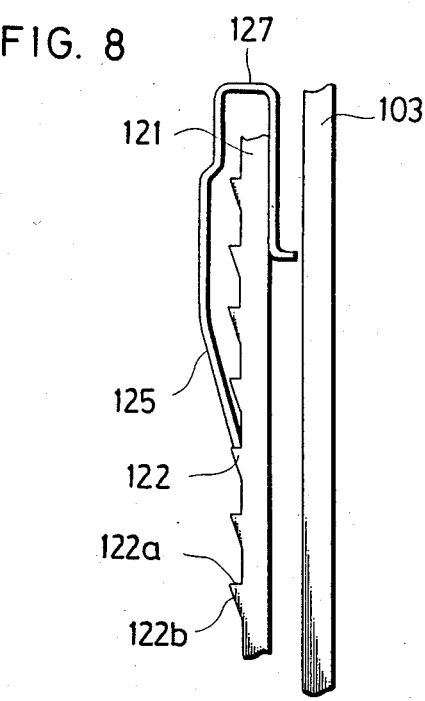
FIG. 8 is an enlarged view showing the arrangement of a control member.
Figure 7:
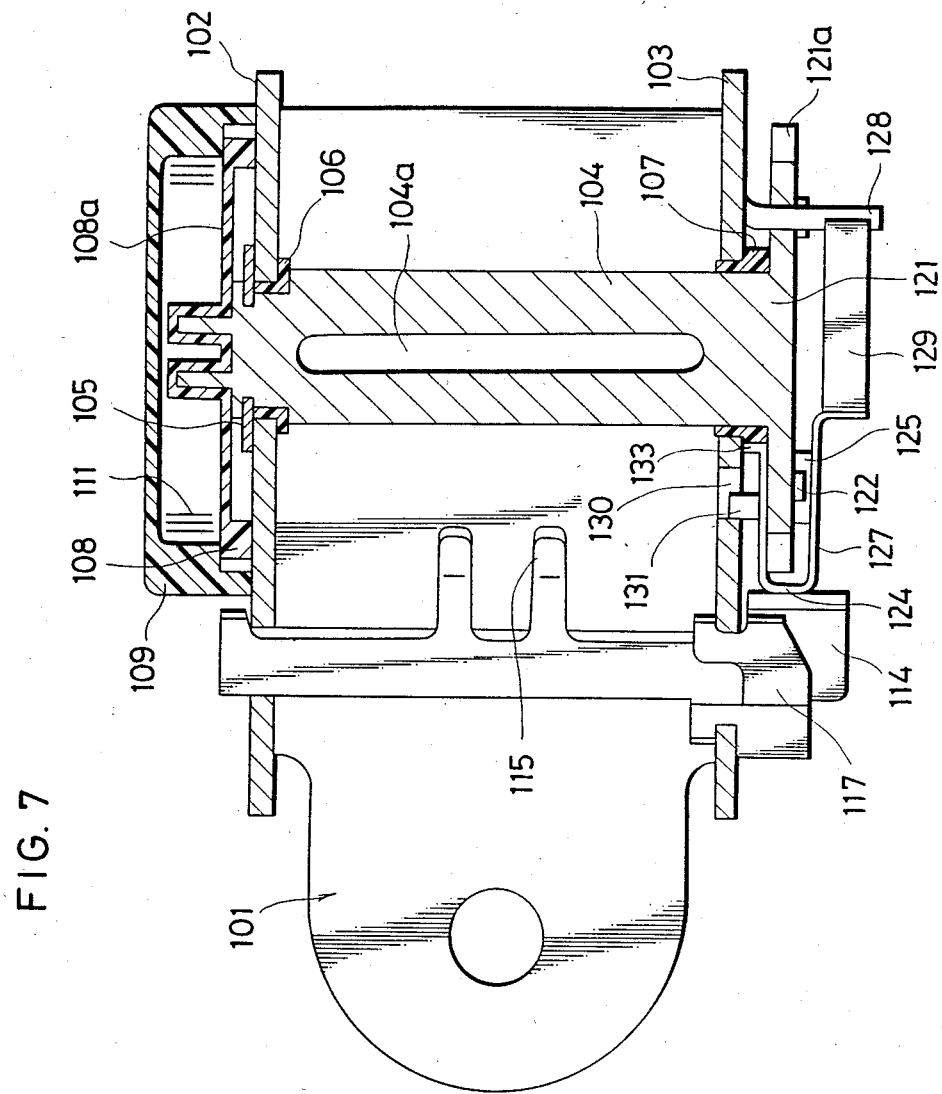
FIG. 7 is a cross-sectional view of the automatic locking retractor, taken along line VII—VII of FIG. 6.

The automatic locking retractor according to the second embodiment of this invention will next be described with reference to FIGS. 6 through 10 of the drawings. Referring first to FIGS. 6 and 7, a take-up spindle 104 on which one end of a webbing (not shown) is fixedly fastened through a through-hole 104a is rotatably supported between side walls 102,103 of a square U-shaped casing 101. The take-up spindle 104 is prevented by a stopper ring 105 from moving along the axis of rotation thereof and is supported on the casing 101 by way of bushes 106,107 fit within openings formed respectively through the side walls 102,103 of the casing 101. The take-up spindle 104 is biased in the webbing-winding direction (i.e., in the clockwise direction as seen in FIG. 6) by means of a take-up spring 111 which is hooked at the inner end thereof on a spring plate 108 fixed to one end of the take-up spindle 104 and at the outer end thereof on a spring cover 109 mounted fixedly on the side plate 102. The spring plate 108 includes a disc-shaped portion 108, whereby to prevent grease for the take-up spring 111 from spreading to the webbing.

Through the side walls 102,103, sector-shaped openings 113 are bored in a mutually-opposing relation. A lock lever 114, which serves as an interlocking member, extends through the sector-shaped openings 113, in which the lock lever 114 is tiltably supported. A sensor 115, which is adapted to determine the diameter of the webbing taken up on the take-up spindle and then to actuate the lock lever 114 depending on the size of the diameter, is formed on the lock lever 114 at a longitudinal midpoint thereof. The lock lever 114 is biased toward an engagement position (i.e., in the clockwise direction as seen in FIG. 6; will be described herein) by a leaf spring 117 which is fixedly secured as a biasing member by a notch 116 formed in the edge of the opening 113.

On an end portion of the take-up spindle 104 which end portion extends outside the side wall 103, a latch plate 121 as an interlocked member is provided as a unitary member. Thus, the take-up spindle 104 and latch plate 121 rotate as unitary members. The latch plate 121 has a plurality (6 in the illustrated embodiment) of teeth 121a, each having an interlocking surface directed to the webbing-releasing direction, in the circumference thereof and eighteen protrusions 122 on the outer surface thereof. As clearly shown in FIG. 8, each of the protrusions 122 has a first interlocking surface 122a directed as an acting portion toward the webbing-winding direction and the surface opposite to the first interlocking surface 122a forms a second interlocking surface 122b tilted with respect to the webbing-releasing direction.

Adjacent to the latch plate 121, a control member, namely, a control plate 127 equipped with a working portion 124 and a leaf spring portion 125 as an interlocking portion and made of a spring-forming steel sheet, a plastic or the like is provided movably within a predetermined range. Formed further on the control plate 127 are a biasing leaf spring portion 129, which extends in a U-like configuration from its portion extending over the outer surface of the latch plate 121, is received at its outer extremity in a hook formed in the side wall 103 by lancing and urges the control plate counterclockwise about the latch plate 121 and radially and outwardly, and a projection 131 extending outwardly from a portion, which extends between the latch plate 121 and side wall 103, into a slot 130 formed through the side wall 103 for limiting the movement of the control plate 127. In the illustrated embodiment, the biasing leaf spring portion 129 is formed as a unitary member with the control plate 127 and serves as biasing means for urging the control plate 127 both counterclockwise and radially and outwardly. However, it may be formed separately from the control plate 127 or may be provided as first biasing means and second biasing means which are discrete from each other and urge the control plate 127 respectively counterclockwise and radially and outwardly. The inner end of the portion of the control plate 127, which portion extends between the side plate 103 and latch plate 121, is kept in contact with the bush 107 so that it serves as a positioning portion 133 determining the radially-central position of the control plate 127.

In the above-described manner, the control plate 127 is provided on the side wall 103 in such a way that the control plate 127 is movable between a non-working position, where the control plate has moved counterclockwise, namely, in the webbing-releasing direction and is kept at the working portion 124 in engagement with the lock lever 114 so as to prohibit the movement of the lock lever 114 toward its lock position, and a working position where the lock lever 114 has moved in the webbing-winding direction and permits the movement of the lock lever 114 toward its lock position and is also movable between an engagement position, where the leaf spring portion 125 has moved radially and inwardly and is engageable with the interlocking surface 122a of at least one of the protrusions 122 and a non-engagement position where the leaf spring portion 125 has moved radially and outwardly and is kept out of engagement with the interlocking surface 122a of any one of the protrusions 122.

In this embodiment, the first interlocking surfaces 122a of the latch plate 121 are engageable with the leaf spring portion 125 of the control plate 127 which assumes the engagement position. When the take-up spindle 104 rotates in the webbing-winding direction (i.e., in the clockwise direction as seen in FIG. 6), a clockwise force is applied to the control plate 127 so that the control plate 127 is moved clockwise and is brought toward the above-mentioned working position. If the take-up spindle 104 rotates in the webbing-releasing direction (i.e., in the counterclockwise direction as seen in FIG. 6) in the above state, the leaf spring portion 125 slides only on the second interlocking surfaces 122b of the latch plate 122 while undergoing elastic deformation and does not give any influence to the control plate 127.

In addition, the radial and outward biasing force of the biasing leaf spring portion 129 is set to be weaker than the biasing force of the leaf spring 117. When the lock lever 114 is tilted into engagement with the working portion 124 of the control plate 127 upon release of the webbing, the control plate 127 is moved radially and inwardly so as to bring it to the engagement position. Here, the radial and inward movement of the control plate 127 is stopped when the control plate 127 has been brought at the positioning portion 133 into contact with the bush 107.

In order to cover the above elements provided on the side wall 103, a case (not illustrated) is provided fixedly on the side wall 103.

The operation of the second embodiment of the above-described structure will next be described.

FIG. 6 shows a state in which the webbing has been released from its fully-wound state, the control plate 127 has been brought to its non-working position, and the lock lever 114 has been tilted rightward by the biasing force of the leaf spring 117 from the position in its fully-wound state, indicated by a one-dot line to the position where the tip portion of the lock lever 114 is kept in contact with the working portion 124 of the control plate 127. In this state, the lock lever 114 is kept out of engagement with any of the teeth 121a of the latch plate 121 and the webbing can thus be released freely. On the other hand, the control plate 127 has moved toward the non-working position by virtue of the biasing force of the biasing leaf spring portion 129 and also to the engagement position by virtue of the biasing force of the leaf spring 117 applied by way of the lock lever 114. When the take-up spindle 104 rotates in the webbing-releasing direction, the control plate 127 is kept at the above position because no influence is applied from the latch plate 121 to the control plate 127.

Figure 9:
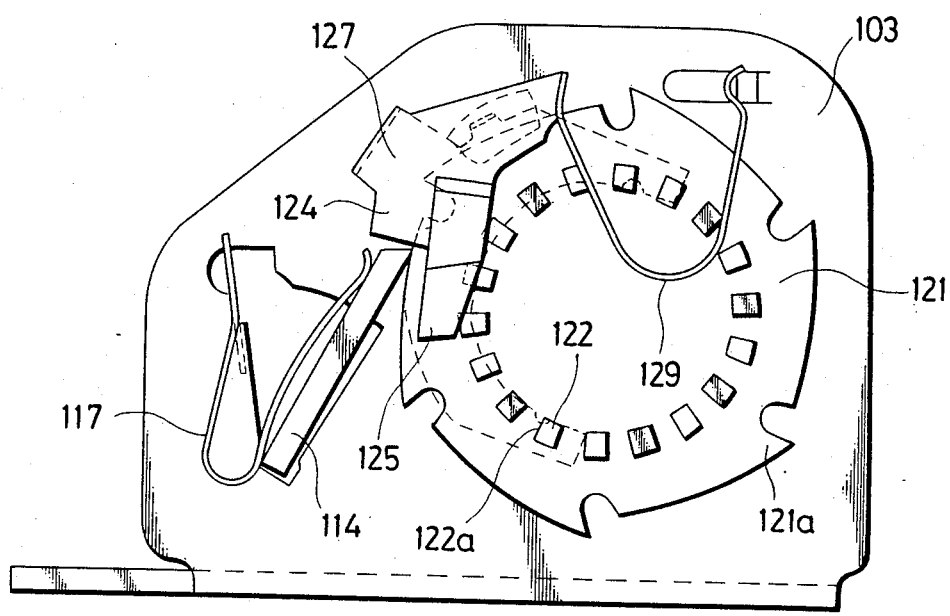
FIGS. 9 and 10 are similar to FIG. 6 and illustrate the operation of the automatic locking retractor of FIG. 6.
Figure 10:
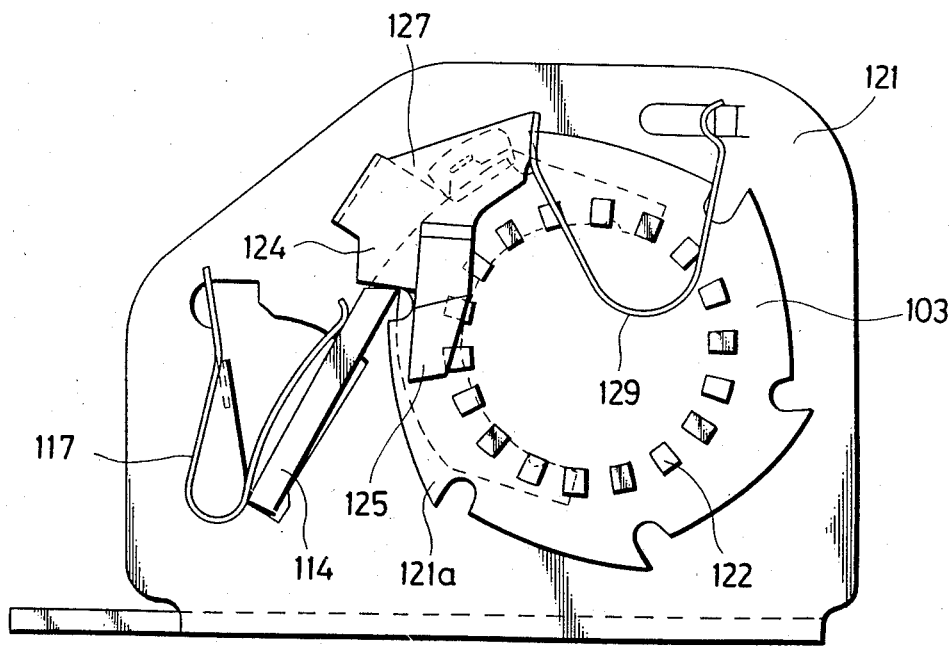

When the webbing is rewound slightly in the webbing-winding direction subsequent to its release to a suitable length, the control plate 127 moves to the working position by a clockwise force applied by way of the first interlocking surfaces 122a because the leaf spring portion 125 of the control plate 127 is in the position engageable with the first interlocking surfaces 122a of the latch plate 121. As illustrated in FIG. 9, the lock lever 114 is thus released from the working portion 124 and is rendered engageable with the latch plate 121. Here, the control plate 127 has been pushed radially and outwardly by the leaf spring portion 129 and assumes its non-engagement position. When an attempt is next made to release the webbing, the lock lever 114 is brought into engagement with one of the teeth 121a of the latch plate 121 and the release of the webbing is locked as shown in FIG. 10.

When a further attempt is made to rewind the webbing from the its worn state into the retractor, the buckle of the seat belt system is released for example. The webbing is then wound up on the take-up spindle 111 by the force of the take-up spring 111, since the take-up spindle 114 is not prohibited from rotating in the webbing-winding direction. As the diameter of the thus-wound webbing increases, the sensor 115 which serves to determine the diameter of the webbing take up on the take-up spindle 104 detects the increasing diameter. Thus, the lock lever 114 is raised to its position indicated by a single-dot line in FIG. 6. Here, the control plate 127 is moved again counterclockwise by the biasing force of the leaf spring portion 129, thereby being brought to the non-working position and the non-engagement position. It is now ready for the next release of the webbing.

In the above-described second embodiment of this invention, the protrusions 122 are formed on the outer surface of the latch plate 121. These protrusions may be formed at any place so long as the they rotate as unitary members with the take-up spindle 104. For example, they may be formed on the inner surface of the latch plate 121 or on a portion of the take-up spindle 4 which portion extends outwardly of the side wall 103. Needless to say, the manner of formation of the leaf spring portion 125 which is the interlocking portion of the control plate 127 varies correspondingly.

According to the second embodiment of this invention, the mere addition of the control member allows to function as the automatic locking retractor as mentioned above. Thus, the automatic locking retractor requires fewer parts. Since the interlocked relation between the control member and the take-up spindle has been achieved not by friction but by the mechanical engagement, the automatic locking retractor assures fail-free operation, is free of unnecessary parts movements and enjoys good feeling in its handling. The automatic locking retractor can be manufactured with small dimensions and at a low cost.

Having now fully described the invention, it will be apparent to one of ordinary skill in the art that many changes and modifications can be made thereto without departing from the spirit or scope of the invention as set forth herein.

What is claimed is:

1. An automatic locking retractor comprising
   a casing;
   a take-up reel supported on the casing and rotatable about an axis in a webbing winding direction and a webbing releasing direction and biased in the winding direction of a webbing;
   an interlocked disc-shaped member defining a plurality of teeth in the circumference thereof and rotatable as a unitary member with the take-up reel, said interlocked disc-shaped member also defining a plurality of first interlocking portions on a side wall thereof;
   an interlocking member supported on the casing movably between an engagement position and a non-engagement position in accordance with the diameter of the webbing taken up on the take-up reel, said interlocking member being brought into engagement with any one of the teeth of the interlocked member at the engagement position so as to prohibit the rotation of the take-up reel in the webbing-releasing direction but being kept out of engagement with any of the teeth of the interlocked member at the non-engagement position so as to permit free rotation of the take-up reel;
   a control member provided with a plurality of second interlocking portions and supported on the take-up reel;
   a first guide means for guiding the control member turnably within a predetermined range which extends between a non-working position most turned in the webbing-releasing direction and a working position most turned in the webbing-winding direction, both about the axis of the take-up reel;
   a second guide means for guiding the control member movably in a direction perpendicular to the axis of the take-up reel between an engagement position where the second interlocking portions engage the first interlocking portions and a non-engagement position where the second interlocking portions are maintained out of engagement with the first interlocking portions, said control member having a working portion capable of engaging the interlocking member at the non-working position to inhibit the movement of the interlocking member to the first engagement position and a non-working portion permitting the movement of the interlocking member to the first engagement position at the working position; and
   means for allowing at least one of the second interlocking portions of the control member to engage at least one of the first interlocking portions when the diameter of the webbing taken up on the take-up reel decreases and the interlocking member is brought into engagement with the working portion upon release of the webbing, whereby upon subsequent rotation of the take-up reel in the webbing-winding direction, the control member turns in the same direction as the take-up reel and hence moves from the non-working position to the working position.

2. An automatic locking retractor as claimed in claim 1, wherein the second guide means is an elongated opening through which the axis of the take-up reel extends, and the elongated opening is formed through the control member.

3. An automatic locking retractor comprising:
   a casing;
   a take-up reel rotatably supported on the casing and biased in the winding direction of a webbing;
   an interlocked member rotatable as a unitary member with the take-up reel;
   an interlocking member supported on the casing movably between an engagement position and a non-engagement position in accordance with the diameter of the webbing taken up on the take-up reel, said interlocking member being brought into engagement with the interlocked member at the engagement position so as to prohibit the rotation of the take-up reel in the webbing-releasing direction;
   means for permitting the movement of the interlocking member to the engagement position upon release of the webbing over at least a predetermined length thereof from the take-up reel and subsequent turn of the take-up reel in the webbing-winding direction; and
   means for allowing the interlocking member to engage the interlocked member again while absorbing impact to be produced upon contact of the interlocking member with the interlocked member when the interlocking member moves toward the engagement position after the interlocking member has once been disengaged from the interlocked member upon further rotation of the take-up reel in the webbing-winding direction.

4. An automatic locking retractor as claimed in claim 3, wherein the impact-absorbing means includes spring means.

5. An automatic locking retractor comprising:

a casing;

a take-up reel supported on the casing rotatable about an axis in a webbing winding direction and a webbing releasing direction and biased in the winding direction of a webbing;

an interlocked disc-shaped member defining a plurality of teeth in the circumference thereof and rotatable as a unitary member with the take-up reel, said interlocked disc-shaped member also defining a plurality of first interlocking portions on a side wall thereof;

an interlocking member supported on the casing movably between an engagement position and a non-engagement position in accordance with the diameter of the webbing taken up on the take-up reel, said interlocking member being brought into engagement with any one of the teeth of the interlocked member at the engagement position so as to prohibit the rotation of the take-up reel in the webbing-releasing direction but being kept out of engagement with any of the teeth of the interlocked member at the nonengagement position so as to permit free rotation of the take-up reel;

a control member provided with a working portion and a plurality of second interlocking portions;

a first guide means for guiding the control member between a non-working position, where the working portion is engaged with the interlocking member, and a working position where the working portion is maintained out of engagement with the interlocking member;

a second guide means for guiding the control member between an engagement position, where the second interlocking portions engage the first interlocking portions, and a non-engagement position where the second interlocking portions are maintained out of engagement with the first interlocking portions; and means for allowing at least one of the second interlocking portions of the control member to engage at least one of the first interlocking portions when the diameter of the webbing taken up on the take-up reel decreases and the interlocking member is brought into engagement with the working portion upon release of the webbing, whereby upon subsequent rotation of the take-up reel in the webbing-winding direction, the control member moves from the non-working position to the working position.

* * * * *